United States Patent [19]

Machida

[11] 3,949,419
[45] Apr. 6, 1976

[54] MAGNETIC RECORDING APPARATUS
[75] Inventor: Keisuke Machida, Yokohama, Japan
[73] Assignee: Sony Corporation, Tokyo, Japan
[22] Filed: Sept. 16, 1974
[21] Appl. No.: 505,993

[30] Foreign Application Priority Data
Sept. 21, 1973 Japan............... 48-110920[U]

[52] U.S. Cl.................................. 360/64; 360/66
[51] Int. Cl.²........................................ G11B 15/14
[58] Field of Search............... 360/61, 62, 63, 64, 66

[56] References Cited
UNITED STATES PATENTS
3,705,272   12/1972   Tsuji et al.................. 360/62

Primary Examiner—James W. Moffitt
Attorney, Agent, or Firm—Lewis H. Eslinger; Alvin Sinderbrand

[57] ABSTRACT

A magnetic recording apparatus comprised of a plurality of magnetic recording heads for recording an input signal on a record medium, the recording heads are selectively supplied with a bias current superimposed on the input signal to be recorded so that a selected one of the heads is rendered operative in accordance with the amount of bias current supplied thereto so as to record the input signal. The operability of the recording heads is controlled to be a function of the position of the heads with respect to the record medium.

10 Claims, 3 Drawing Figures

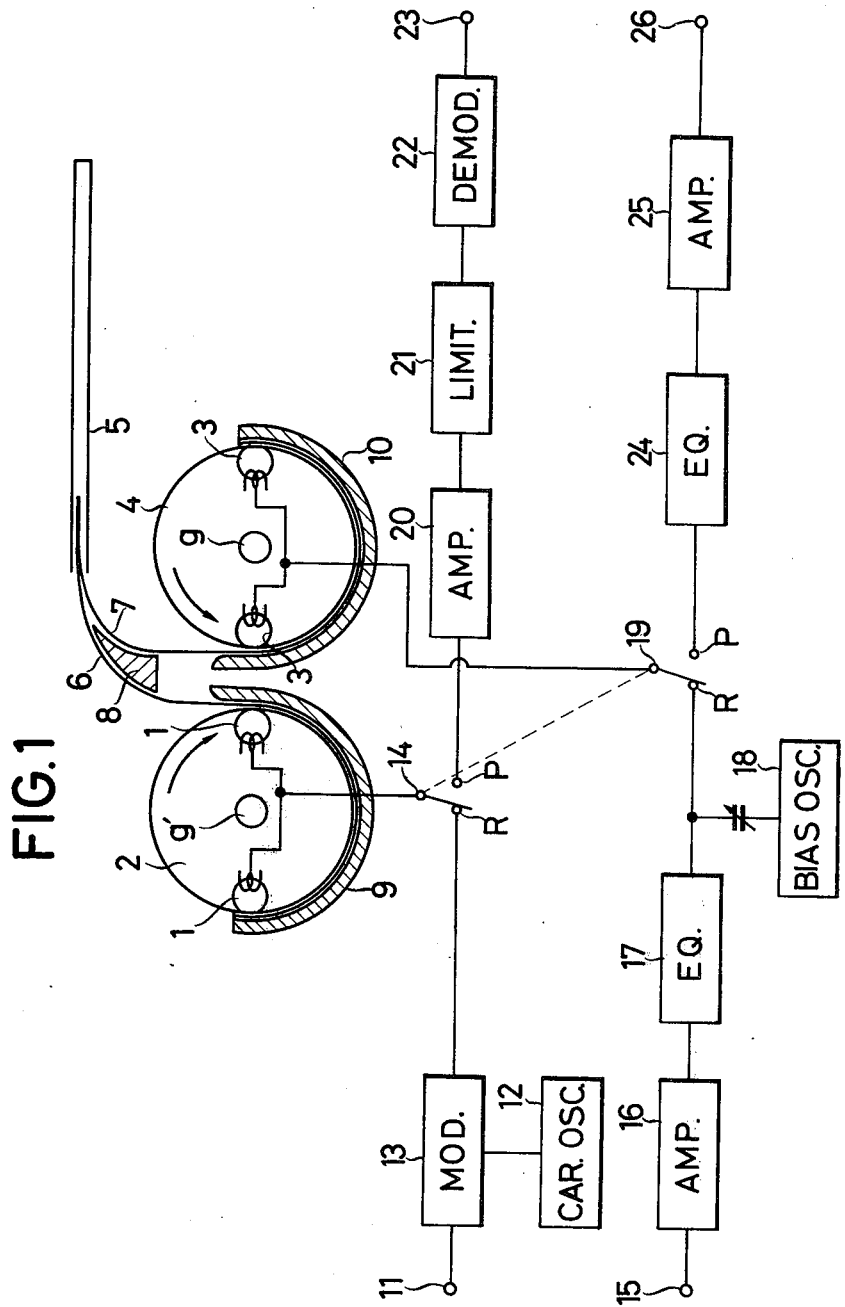

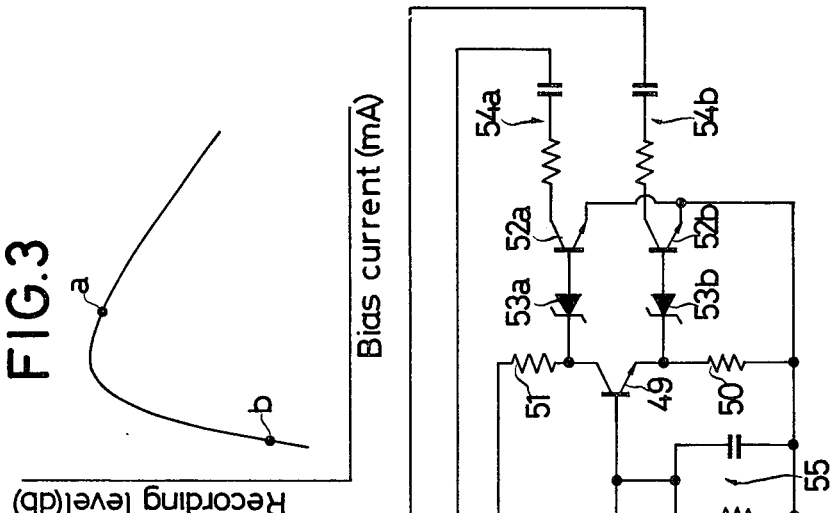
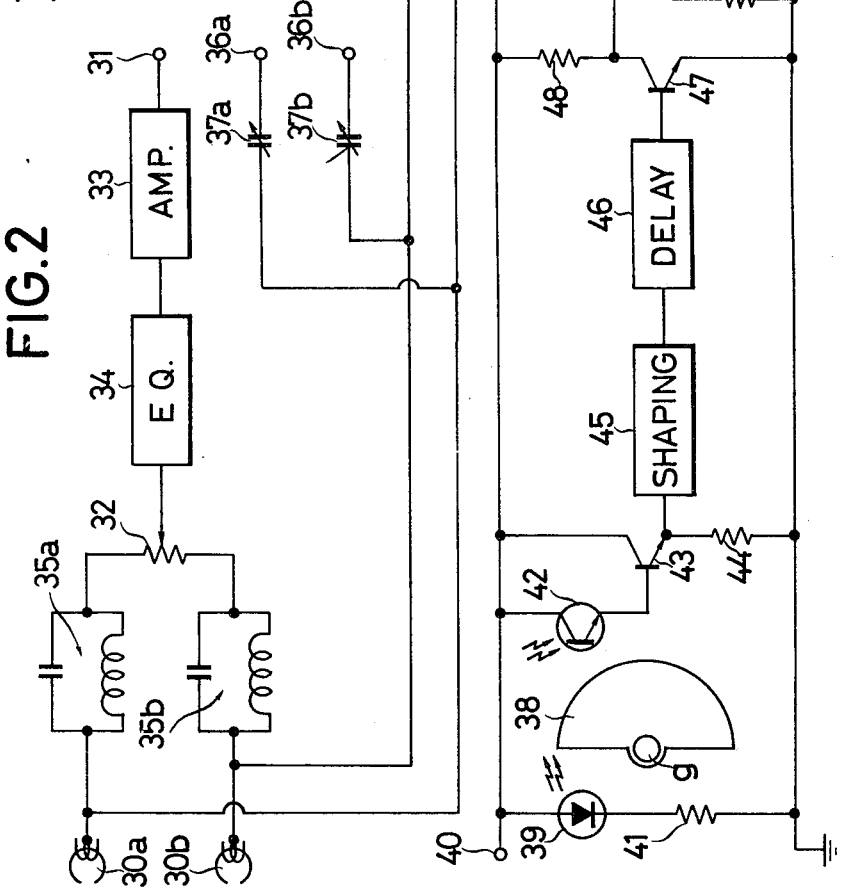

MAGNETIC RECORDING APPARATUS

BACKGROUND OF THE INVENTION

This invention relates to magnetic recording and/or reproducing apparatus and, more particularly, to such apparatus employing plural magnetic heads which are selectively rendered operative to record and/or reproduce a signal.

Magnetic recording and/or reproducing apparatus employing a plurality of magnetic heads finds ready application in video tape recording (VTR) apparatus. Generally, such recording and/or reproducing apparatus is provided with a guide drum and a plurality of rotary magnetic heads disposed about the periphery of the guide drum. A magnetic recording medium is wound or otherwise deployed about at least a portion of the surface of the guide drum to permit the rotary magnetic heads to scan such recording medium. If the magnetic recording medium is a conventional magnetic tape, the rotary magnetic heads scan successive parallel lines which are skewed with respect to the length of the tape. Depending upon the mode of operation, the rotary heads serve to record signals on or reproduce signals from the scanned parallel tracks. If the magnetic recording medium is a magnetic sheet, the rotary heads function to scan parallel tracks across the surface of such sheet. Relative motion is imparted in an axial direction between the magnetic sheet and the rotary heads such that a multiple of parallel signal tracks are provided. Generally, the rotary heads are spaced such that when one rotates out of recording (or reproducing) relationship another head simultaneously rotates into such recording (or reproducing) relationship. In accordance with one example of typical prior art apparatus, one rotary head leaves the sheet just as another moves into contact therewith. Clearly, signals supplied to both of such rotary heads might be recorded simultaneously by the departing and entering heads. Such signal overlap can result in undesired and deleterious affects and is usually avoided by providing a switching circuit which determines the appropriate rotary head to be supplied with a signal for recording or reproducing. That is, the signal supplied to the departing rotary head will be switched over to the entering rotary head at the proper time so as to eliminate signal overlap.

If the signal supplied to the rotary heads for recording (or reproducing) includes a periodic interval during which no information is present, such as the blanking interval of a television signal, the switching circuit is synchronously operated to effect the change-over during such blanking interval so as to avoid switching noise which might otherwise be present. However, if the signal to be recorded does not include such periodic blanking interval, or if such signal is provided with an irregular or random blanking interval, the synchronous operation of the switching circuit will not provide change-over during periods of no information. For example, if an audio signal is to be recorded by the aforenoted magnetic recording and/or reproducing apparatus, the absence of a periodic blanking interval in the audio signal prevents the timed operation of the switching circuit during periods of no information. Consequently, the inherent switching noise associated with such change-over switching operation will be present. This is an attendant disadvantage of prior art magnetic recording apparatus.

OBJECTS OF THE INVENTION

Therefore, it is an object of the present invention to provide improved magnetic recording apparatus.

It is another object of the present invention to provide improved magnetic recording apparatus wherein a plurality of magnetic heads are used to record an input signal on a recording medium.

It is a further object of the present invention to provide a magnetic recording apparatus having a plurality of magnetic heads for recording an input signal on a recording medium and wherein the input signal is switched between recording heads without attendant switching noise.

A still further object of this invention is to provide a magnetic recording apparatus having a plurality of magnetic heads wherein such heads are rendered selectively operable to record an input signal without accompanying switching noise.

Yet another object of this invention is to provide magnetic recording and/or reproducing apparatus having a plurality of magnetic heads which are selectively controlled to have a sufficient recording level so that an input signal can be recorded on a medium thereby and wherein the plural heads are controlled in a selective manner to avoid signal recording and/or reproducing overlap without requiring the use of a switch circuit.

Various other objects and advantages of the present invention will become clear from the ensuing detailed description of certain preferred embodiments thereof, and the novel features will be particularly pointed out in the appended claims.

SUMMARY OF THE INVENTION

In accordance with the present invention, magnetic recording apparatus is provided with a plurality of magnetic recording heads for recording an input signal on a recording medium and including control means for regulating the superimposition of bias current superimposed on the input signal and applied to the recording heads to thereby enable selected heads to exhibit a recording level sufficient to record the input signal. In one preferred embodiment, the bias current applied to the recording heads is regulated in timed relation with the scanning of the medium by the heads so that one head which is departing from the medium is effectively disabled while another head which arrives at the medium is effectively enabled.

BRIEF DESCRIPTION OF THE DRAWINGS

The following detailed description will be best understood in conjunction with the accompanying drawings in which:

FIG. 1 is a block diagram representing one application of the improved magnetic recording and/or reproducing apparatus in accordance with the present invention;

FIG. 2 is a schematic diagram representing one of the preferred embodiments of the present invention; and FIG. 3 is a graphical representation which is useful in explaining the principles of operation of the present invention.

DETAILED DESCRIPTION OF CERTAIN ONES OF THE PREFERRED EMBODIMENTS

Referring now to the drawings and, in particular, to FIG. 1, magnetic recording and/or reproducing apparatus is illustrated in block diagram representation. The illustrated apparatus find ready application in recording and reproducing video signals such as television signals, and is comprised of first and second signal recording and/or reproducing devices. A first recording/reproducing device is comprised of a pair of rotary magnetic heads 1, a rotary disc 2 and a guide member 9. The rotary heads 1 are adapted to record and/or reproduce a video signal supplied thereto. These heads are secured to the rotary disc 2 and are spaced apart from each other by approximately 180°. As illustrated, the heads 1 are disposed at the periphery of the disc 2.

The second magnetic recording/reproducing device is comprised of a pair of rotary magnetic heads 3, a rotary disc 4 and a guide member 10. The first and second recording/reproducing devices are similar and the heads 3, which are adapted to record and/or reproduce a signal are secured to the periphery of the rotary disc 4 and are spaced apart from each other by approximately 180°. For the application wherein the illustrated recording/reproducing devices are used to record and/or reproduce television signals, the magnetic heads 3 are adapted to record and/or reproduce an audio signal. As a numerical example, the heads 1, and thus the disc 2, are rotated at the rate of 30 r.p.s. and the heads 3, and thus the disc 4 are rotated at the rate of 5 r.p.s., the respective heads being rotated in counter directions are represented by the arrows.

The rotary heads 1, as well as the heads 3, are adapted to record signals on and/or reproduce signals from magnetic media, such as respective magnetic sheets. As diagrammatically represented in FIG. 1, a pair of magnetic sheets 6 and 7 are contained in a suitable envelope 5 therefor. Although not shown herein, it should be appreciated that appropriate apparatus is provided to withdraw the magnetic sheets from the envelope and to separate the sheets from each other. A separating member 8 is illustrated to more clearly represent the function performed by such separating apparatus. Once separated, the sheets 6 and 7 are guided by respective guide members 9 and 10 so as to be wound about at least a portion of the discs 2 and 4, respectively. Preferably, each sheet is deployed about a segment of each disc equal to approximately 180°. Each sheet, as thus wound, defines a portion of a cylindrical surface. A more detailed description of the magnetic recording sheets, the envelope therefor and the sheet separating and driving apparatus for deploying the sheets about the illustrated discs is found in copending United States Patent application Ser. No. 485,549 filed on July 3, 1974 by Nobutoshi Kihara and Osamu Shimada, entitled "Video Recording and/or Reproducing Apparatus" and having the same assignee as the present invention.

As noted hereinabove, in one preferred embodiment of the illustrated apparatus, video signals are recorded on the magnetic sheet 6 and audio signals are recorded on the magnetic sheet 7. The video signal processing apparatus is comprised of a modulator 13 and an oscillator 12. A video signal input terminal 11 is connected to a first input of the modulator 13 and the oscillator 12 is connected to a second input of the modulator. As one example, the modulator 13 comprises a phase modulator wherein the video signal phase modulates a carrier signal supplied to the modulator by the oscillator 12. Accordingly, the oscillator comprises a carrier oscillator. The resultant phase-modulated signal produced by the modulator 13 is supplied to the rotary magnetic heads 1 by a switch 14. This switch includes a first fixed contact R, a second fixed contact P and a moveable contact adapted to selectively engage one of the fixed contacts. When a recording operation is desired, the moveable contact engages the fixed contact R to thus supply the phase-modulated video signal to the magnetic heads 1. When a signal reproducing operation is desired, the switch 14 is operated whereby the moveable contact engages the fixed contact P. In this latter position, the recorded signals picked up by the rotary heads 1 are supplied to the signal reproducing apparatus, described below.

The rotary heads 3 are adapted to be selectively coupled to audio signal processing apparatus for the recording and/or reproducing operations. The audio signal processing apparatus is comprised of an amplifier 16, an equalizer 17 and a bias oscillator 18. The amplifier 16 is connected to an audio signal input terminal 15. The output of the amplifier is coupled through the equalizer 17 to a switch 19. As will be described further hereinbelow, the bias oscillator 18 is adapted to supply a bias current to the rotary heads 3 through a variable capacitive impedance. The switch 19 serves to selectively connect the rotary heads 3 to the equalizer 17 and to audio signal reproducing apparatus. The switch 19 is similar to the aforedescribed switch 14 and includes a first fixed contact R, a second fixed contact P and a moveable contact adapted to selectively engage one of the fixed contacts. When in the signal recording mode, the switch 19 is operated so that the moveable contact engages the fixed contact R whereby the audio signal supplied through the amplifier 16 and the equalizer 17 is coupled to the rotary heads 3. During a signal reproducing mode, the switch 19 is operated so that the moveable contact engages the fixed contact P, whereby the signals picked up by the rotary heads 3 are supplied to the audio signal reproducing apparatus. As is illustrated, the switches 14 and 19 are ganged for simultaneous operation. Thus, as the discs 2 and 4 are rotated about their respective axes g' and g, the video signal magnetic heads 1 and the audio signal magnetic heads 3 are driven in the illustrated directions. During a signal recording operation, the phase-modulated video signal is supplied through the switch 14 to be recorded in parallel recording tracks on the magnetic sheet 6. Simultaneously, the audio signal supplied through the amplifier 16 and the equalizer 17 is coupled through the switch 19 to the rotary heads 3 so as to be recorded in parallel tracks on the magnetic sheet 7. Additionally, the bias current generated by the oscillator 18 and superimposed onto the audio signal is also supplied to the rotary heads 3.

During signal reproduction, the switches 14 and 19 are operated such that their respective moveable contacts engage the fixed contacts P and P, respectively. In this configuration, the video signals previously recorded on the magnetic sheet 6 are picked up by the rotary heads 1 and supplied through the switch 14 to video signal reproducing apparatus. Simultaneously, the audio signals previously recorded on the magnetic sheet 7 are picked up by the rotary heads 3 and supplied through the switch 19 to audio signal reproducing apparatus. As illustrated, the video signal reproducing apparatus is comprised of an amplifier 20, a limiter 21 and a demodulator 22, all connected in series to the fixed contact P of the switch 14. The output of the demodulator 22 is supplied to a video signal output terminal 23. It is appreciated that the demodulator 22 operates to recover the video signal that previously had been phase-modulated by the modulator 13. Accordingly, the demodulator 22 can comprise a phase-demodulator.

The audio signal reproducing apparatus is comprised of an equalizer 24 and an amplifier 25, connected in series to the fixed contact P of the switch 19. The output of the amplifier 25 is connected to an audio signal output terminal 26. Accordingly, during a reproducing mode, the audio signals that previously had been recorded on the magnetic sheet 7 are picked up by the rotary heads 3 and supplied through the switch 19 to the equalizer 24, the amplifier 25 and thence to the audio signal output terminal 26.

As previously noted, a video signal is usually provided with a blanking interval during which no picture information is present. Accordingly, the video signal supplied to the rotary heads 1 can be switched therebetween by conventional change-over switching apparatus which is operated during the blanking interval times without attendant switching noise. That is, the video signal is supplied to one of the rotary heads 1 while it is in contact with, or scanning, the magnetic sheet 6. When such rotary head departs from the magnetic sheet, the video signal is then switched to the other rotary head which is now arriving at the magnetic sheet. Althought this switching technique operates satisfactorily for video signals, a similar technique is accompanied by undesired switching noise when used with audio signals. This obtains because the audio signal is not provided with a blanking interval or with a periodic interval during which no useful information is present. There is thus no convenient time period during which change-over switching apparatus can be operated to switch the audio signals from one rotary head to another. The present invention advantageously permits the audio signal to be effectively switched from one rotary head to another to thereby avoid undesired signal overlap without accompanying switching noise. This switching feature is achieved by the apparatus illustrated in FIG. 2.

Referring now to FIG. 2, there is illustrated a schematic diagram representing one embodiment of the control apparatus which is used to effectively switch the audio signal from one rotary head to another during a recording operation. Audio signal processing apparatus is comprised of an amplifier 33, an equalizer 34, bias trap circuits 35a and 35b and rotary heads 30a and 30b. The amplifier and equalizer are connected in series and are substantially similar to the aforedescribed amplifier 16 and equalizer 17, respectively, of FIG. 1. Accordingly, the series combination of amplifier and equalizer are adapted to receive an audio signal supplied thereto by an audio signal input terminal 31. The output of the equalizer 34 is connected to both of the rotary heads 30a and 30b by bias trap circuits 35a and 35b, respectively. The rotary heads 30a and 30b are substantially similar to the aforedescribed rotary heads 3 of FIG. 1. The bias trap circuits are adapted to present a high impedance to a bias current supplied thereto so as to prevent such supplied bias current from being transmitted to the equalizer 34. The bias trap circuits also present a relatively low impedance to the audio signal supplied thereto. Accordingly, the bias trap circuits are formed of reactive components which exhibit a variable impedance that is dependent upon the frequency of a signal supplied thereto. The frequency of the bias signal is such that the reactive components present a high impedance thereto and the frequencies of the audio signal are such that the reactive components present a low impedance thereto. As illustrated, the output of the equalizer 34 is supplied through a variable resistor such as a potentiometer, to each of the bias trap circuits 35a and 35b. Accordingly, the potentiometer is connected across the respective bias trap circuits and the moveable contact of the potentiometer is connected to the output of the equalizer 34. Accordingly, the audio signal supplied to the audio signal input terminal 31 and through the amplifier 33 and equalizer 34 is continuously coupled to both rotary heads 30a and 30b. The variable resistor 32 is adapted to be adjusted such that the levels of the signals supplied to the respective rotary heads are equal.

A source of high frequency bias current, such as a bias oscillator similar to the aforenoted oscillator 18, is provided and is adapted to supply such bias current to bias current input terminals 36a and 36b, respectively. The bias current input terminals are connected to the rotary heads 30a and 30b by variable capacitive impedances 37a and 37b, respectively. Such variable capacitive impedances can be conventional variable capacitance devices and are adapted to establish a predetermined bias current level. As is appreciated, the magnitude of the bias current supplied to a rotary magnetic head determines the recording level of that head. In particular, if the amount of bias current supplied to the recording head is reduced below a threshold level, the recording level of that head is not sufficient to enable the audio signal supplied thereto to be recorded. The variable capacitance devices 37a and 37b are adapted to establish the proper bias current magnitude whereby the rotary magnetic heads 30a and 30b are provided with a sufficient recording level to record the audio signals.

One preferred embodiment of control apparatus which is used to control the magnitude of the bias current supplied to the rotary heads 30a and 30b, and thus to control the recording level of such heads will now be described. It is recalled that the rotary heads are driven about an axis of rotation g. Apparatus is provided to detect the relative position of the rotary heads with respect to the magnetic sheet 7 and to generate indications thereof. Such apparatus is comprised of a light-shield plate 38, a light source 39, a light detector 42, a shaping circuit 45 and a delay circuit 46. The light-shield plate 38 is mounted on the axis of rotation g and is adapted to rotate together with the rotary magnetic heads. Thus, the light-shield plate rotates in sychronism with the rotation of the heads.

The light souce 39, which may comprise a light emitting diode (LED), or other suitable source of radiation, is fixedly positioned and is energized by a circuit formed of a source of energy 40, a load resistor 41 and a reference potential, such as ground. When energized, the light source 39 emits radiant energy which is transmitted to the light detector 42. In particular, the light transmission path extending between the light source and the light detector is periodically intercepted by the rotating light-shield plate 38. As illustrated, the plate 38 is of semi-circular configuration and is adpated to prevent the radiant energy emitted by the light source 39 from being transmitted to the light detector 42 for a period of 180° during each complete rotation (360°) of the plate (and thus the rotary heads). That is, as the rotary heads rotate about the axis g, the light emitted by the light source 39 is intermittently interrupted.

The light detector 42 may comprise any conventional photoresponsive element adapted to produce a first output signal when light impinges thereon and a second output signal when the impinging light is interrupted or is reduced to a low intensity. In the illustrated embodiment, the light detector 42 comprises a phototransistor. As is appreciated, the phototransistor is rendered conductive when light transmitted from the light source 39 impinges thereon and is rendered nonconductive when the light which is emitted by the light source is intercepted, or blocked, by the plate 38. The collector electrode of the phototransistor 42 is connected to the source of energy 40 and the emitter electrode thereof is connected to the base electrode of a transistor 43. The transistor 43 is disposed in emitter-follower configuration whereby the collector electrode thereof is connected to the source of energy and the emitter electrode is connected through an emitter load resistor 44 to ground. Hence, it is appreciated that when the phototransistor 42 is rendered conductive, a relatively high potential is applied to the base electrode of the transistor 43 which thus renders the latter transistor conductive.

The output of the transistor 43, i.e., the emitter electrode thereof, is connected to the shaping circuit 45. The shaping circuit is adapted to sense when the transistor 43 is conductive and to generate an output signal of predetermined shape in response thereto. Accordingly, the shaping circuit 45 preferably comprises a Schmitt trigger. Hence, a pulse signal of predetermined duration is generated by the shaping circuit 45 when the transistor 43 is rendered conductive. The output of the shaping circuit 45 is coupled through the delay circuit 46 to a transistor 47. The delay circuit 46 is adapted to impart a time delay to the pulse signal generated by the shaping circuit, the time delay being a function of the juxtapositioning of the light source 39, the plate 38 and the rotary heads. That is, it is desirable to supply a pulse signal to the transistor 47 when one rotary head is just departing from the magnetic sheet 7 and the other rotary head is just arriving at the magnetic sheet. If the light source 39 and plate 38 are positioned such that the transistor 43 is rendered conductive simultaneously with the arrival of a rotary head at the magnetic sheet, the pulse signal generated by the shaping circuit 45 will concur in time therewith and the delay circuit 46 will not be necessary. However, if the light source 39 and plate 38 are positioned such that the transistor 43 is rendered conductive prior to the arrival of the rotary head at the magnetic sheet, the pulse signal generated by the shaping circuit 45 will exhibit a leading relationship. Consequently, a time delay should be imparted to that pulse signal so that it concurs in time with the arrival of the rotary head at the magnetic sheet, i.e., the rotation of the head to a reference position. The amount of time delay that is imparted to the pulse signal is seen to be dependent upon the difference between the time at which the transistor 43 is energized and the moment at which the rotary head rotates to its reference position. Of course, if the angular relation of the plate 38 on the axis $g$ is adjusted so that light first impinges upon the phototransistor 42 concurrently with the rotation of the rotary head to its reference position, the delay circuit can be omitted. However, as is readily apparent, it is much easier to modify the electrical characteristics of the signal produced by the shaping circuit 45 than to modify the mechanical characteristics of the illustrated system. Nevertheless, the use of the delay circuit can be seen to be optional.

The transistor 47 is disposed in common-emitter configuration and includes a collector electrode coupled through a collector load resistor 48 to the source of energy 40 and an emitter electrode connected to ground. The transistor is adapted to drive a further transistor 49 in response to the pulses supplied thereto by the shaping circuit 45 through the delay circuit 46. It is now appreciated that the transistor 47 is actuated by switching pulses which are timed to occur when one rotary magnetic head begins to depart from the magnetic sheet 7 and the other rotary magnetic head begins to arrive at the magnetic sheet. For the embodiment wherein the rotary magnetic heads are in contact with the magnetic sheet during the recording and/or reproducing operation, the transistor 47 is actuated when, for example, the rotary head 30a starts to separate from the magnetic sheet while the other rotary head 30b initiates contact with the magnetic sheet. As will be further explained hereinbelow, the duration of the pulse generated by the shaping circuit 45 coincides with the conductivity of the phototransistor 42 and the transistor 43. Consequently, the transistor 47 is rendered conductive throughout the entire interval during which the rotary head 30b remains in contact with the magnetic sheet. The transistor 47 assumes its nonconductive state when the rotary head 30a initiates contact with the magnetic sheet while the rotary head 30b starts to separate from the sheet.

The transistor 49, which is driven by the transistor 47, includes a collector load resistor 51 connected to the source of energy 40 and an emitter load resistor 50 connected to ground. The transistor 49 is adapted to operate as a phase-splitting circuit and is responsive to the conductivity of the transistor 47 to generate mutually phase-inverted switching pulses. That is, when the transistor 47 is rendered conductive, the transistor 49 is seen to be nonconductive whereby a positive pulse is derived at the collector electrode thereof. Conversely, when the transistor 47 is rendered non-conductive, the transistor 49 admits of its conductive state and a positive pulse is derived at the emitter electrode thereof. These mutually phase-inverted switching pulses are supplied through Zener diodes 53a and 53b to the base electrodes of transistors 52a and 52b, respectively.

The transistors 52a and 52b are provided in circuits which are adapted to attenuate the bias current level established by the variable capacitance devices 37a and 37b. More particularly, the transistor 52a is disposed in a by-pass circuit which includes the filter circuit 54a and which is conncted to the rotary head 30a. The transistor 52b is connected in another by-pass circuit which includes the filter circuit 54b and which is connected to the rotary head 30b. The respective filter circuits 54a and 54b are adapted to present a low impedance to signals of a frequency corresponding to that of the bias current. Thus, for example, if the transistor 52a is actuated, a by-pass circuit extends from the rotary head 30a through the filter circuit 54a, through the conducting transistor 52a to ground. Accordingly, the bias current which is supplied through the variable capacitance device 37a is shunted through this by-pass circuit so that the magnitude thereof is attenuated. Consequently, the rotary head 30a is provided with an insufficient recording level to thereby disable the recording of audio signals supplied thereto. If, at this time, the transistor 52b is not conducting, the bias current supplied through the variable capacitance device 37b is not attentuated. Hence, the recording level of the rotary head 30b is sufficient to record the audio signal supplied thereto. It is, of course, readily apparent that the converse of the foregoing will permit the rotary head 30a to record an audio signal while the rotary head 30b is provided with an insufficient recording level and is effectively disabled from recording the audio signal.

To briefly summarize the operation of the apparatus illustrated in FIG. 2, during recording, the signal to be recorded is supplied to the rotary magnetic heads 30a and 30b. Also, a bias current, initially of predetermined magnitude sufficient to provide an adequate recording level for the rotary heads, is supplied by the variable capacitance devices 37a and 37b. As the rotary magnetic heads 30a and 30b rotate, the light-shield plate 38 rotates therewith to intermittently interrupt the light transmitted to the phototransistor 42 from the light source 39. When light impinges upon the phototransistor, it is rendered conductive to thereby render the transistor 43 conductive. When the light received by the phototransistor is interrupted by the light-shield palte 38, the phototransistor and the transistor 43 are both rendered nonconductive. Accordingly, a pulse having a duration equal to the duration of conductivity of the transistor 43 is generated by the shaping circuit 45 and is suitably delayed by the delay circuit 46. As a result thereof, the transistor 47 is driven into its conductive state when the rotary head 30a is just separating from the magnetic sheet 7 and the magnetic 30b is just contacting the magnetic sheet. While the head 30b is in contact with the magnetic sheet, the transistor 47 is maintained in its conductive state. As the rotary head 30b begins to separate from the magnetic sheet and the rotary head 30a starts to contact the sheet, the transistor 47 is driven to its nonconductive state.

When the transistor 47 admits of its conductive state, that is, when the rotary head 30b first contacts the magnetic sheet and remains in contact therewith until it rotates to its reference position so as to begin separation from the magnetic sheet, the transistor 49 is nonconductive. Accordingly, a relatively high potential is applied to the base electrode of the transistor 52a to establish a by-pass circuit from the rotary head 30a, through the filter 54a, the conducting transistor 52a to ground. At this time, the transistor 52b is nonconductive. Accordingly, the bias current supplied by the variable capacitance device 37a is by-passed through the established by-pass circuit, whereby the magnitude of the bias current supplied to the rotary head 30a is attenuated. Therefore, as the rotary head 30a is now provided with an insufficient recording level, the audio signal supplied thereto cannot be recorded. However, as the bias current supplied to the rotary head 30b is not now attenuated, this rotary head is provided with a sufficient recording level to permit the recording thereby of the signal supplied thereto.

Now, when the rotary head 30b begins to separate from the magnetic sheet 7, the transistor 47 is rendered nonconductive. Accordingly, the transistor 49 now conducts to supply a relatively positive potential to the base electrode of the transistor 52b. As is recognized, the transistor 52a is now turned off and the transistor 52b is turned on. Consequently, a by-pass circuit is established from the rotary magnetic head 30b through the filter 54b through the conducting transistor 52b to ground. As was previously described, the bias current supplied by the variable capacitance device 37b is attenuated so as to provide the rotary head 30b with an insufficient recording level. The rotary head 30b is thus effectively disabled and is not capable of recording the signal supplied thereto. However, at this time when the transistor 52a is turned off, the bias current supplied to the rotary head 30a is not attenuated and this rotary head is now provided with a sufficient recording level to enable the recording thereby of signals supplied thereto.

It should now be appreciated that the bias current selectively supplied to the rotary heads 30a and 30b is superimposed onto the signals which are supplied for recording. Depending upon the magnitude of the superimposed bias current, the associated rotary magnetic head is provided with a sufficient recording level to thereby permit signal recording by the magnetic head. As depicted in the graphical representation, of FIG. 3, during normal recording the bias current superimposed onto the input signal and supplied to the recording head admits of a sufficient magnitude to provide a recording level at point a. If the bias current is decreased to the point b, it is apparent that the recording level of the magnetic head is no longer sufficient to enable signal recording thereby. Consequently, the capability of the magnetic heads to record the signals supplied thereto can be controlled without operating upon the signal which is to be recorded. It is thus understood that the operability of the recording heads is effectively switched from one to the other without accompanying switching noise. Depending upon the magnitude of the bias current supplied thereto, the signal to be recorded is effectively supplied for recording to one of the magnetic heads and is then switched to the other magnetic head as the first head separates from the magnetic sheet and as the other head arrives in contact with the sheet. By selectively controlling the magnitude of the superimposed bias current, the tone quality of the audio signal to be recorded in not deleteriously affected. Preferably, the magnitude of the bias current is reduced to some finite value, although not to an absolutely zero value, so as to obtain a good result in "switching" the operability of the magnetic heads from to the other.

As further illustrated in FIG. 2, a filter circuit 55 can be disposed between the transistors 47 and 49. In particular, the filter circuit is connected between the junction defined by the collector electrode of the transistor 47 and the base electrode of the transistor 49 and ground. The purpose of this filter circuit is to smooth the positive and negative transitions of the switching pulses supplied to the transistor 49 by the transistor 47. That is, if the leading and trailing edges of such switching pulses are made less steep, i.e., if the rise and fall times of the switching pulses are prolonged, undesired noise which might be caused by such transitions is prevented from interfering with the control of the bias current. Such noise would not be transmitted to the recording heads.

While the invention has been particularly shown and described with reference to magnetic recording of audio signals, it will be obvious to those skilled in the art that this invention may be utilized to magnetically record any type signal. Similarly, although the recording medium has been described as a magnetic sheet, it will be readily apparent that the improved magnetic recording apparatus of the present invention finds ready application with any magnetic recording medium wherein a plurality of magnetic recording heads are used to scan the medium and wherein selected heads are rendered operative to record signals on the medium. Consequently, it is appreciated that the foregoing and various other changes and modifications in form and details may be made without departing from the spirit and scope of the invention. It is therefore intended that the appended claims be interpreted as including all such changes and modifications.

What is claimed is:

1. Magnetic recording apparatus for recording an input signal on a magnetic recording medium, comprising:

a plurality of magnetic recording heads connected in parallel circuits to an input terminal of said input signal to be supplied with said input signal for recording same on said recording medium;

bias current generating means for generating a recording bias current determinative of the recording level of said magnetic recording heads;

means coupled to said bias current generating means and said heads for superimposing said bias current on said input signal supplied to said magnetic recording heads; and control means connected to said heads for selectively controlling the amount of bias current superimposed on said input signal so that a selected one of said magnetic recording heads at a time is provided with a recording level sufficient to record said input signal on said recording medium.

2. Magnetic recording apparatus in accordance with claim 1 wherein said selected magnetic recording head is in perioidic contact with said magnetic medium and is provided with said sufficient bias current level during said periodic contact.

3. Magnetic recording apparatus in accordance with claim 2 wherein said magnetic recording heads scan said magnetic medium and further comprising detecting means for detecting when said selected magnetic recording head is sensing said magnetic medium to actuate said control means to supply said sufficient bias current level to said selected current head only when said selected magnetic recording head is scanning said magnetic medium.

4. Magnetic recording apparatus in accordance with claim 2 wherein said magnetic recording heads are rotary magnetic heads mounted on a rotating disc to scan said magnetic medium in successive intervals of time.

5. Magnetic recording apparatus in accordance with claim 4 wherein said magnetic medium is disposed about at least a portion of the periphery of said rotating disc.

6. Magnetic recording apparatus in accordance with claim 4 wherein said rotary magnetic heads comprise two magnetic heads spaced apart from each other by 180°.

7. Magnetic recording apparatus for recording an input signal on a magnetic medium comprising:

a pair of rotary magnetic heads angularly separated from each other by 180° and supplied with an input signal for recording same on said magnetic medium, each of said rotary magnetic heads periodically scanning said magnetic medium in alternation with the other of said heads;

bias current generating means for generating a recording bias current determinative of the recording level of said magnetic heads;

means coupled to said bias current generating means for superimposing said bias current on said input signal supplied to said magnetic heads; and control means for selectively controlling the magnitude of said superimposed bias current on the respective heads so that only the magnetic head which is then scanning said magnetic medium is provided with a bias current having a level sufficient to record said input signal on said magnetic medium.

8. Magnetic recording apparatus in accordance with claim 7 wherein said control means includes rotary head position detecting means for detecting the relative position of said rotary magnetic heads with respect to said magnetic medium to select the rotary magnetic head then scanning said magnetic medium to receive said sufficient bias current level.

9. Magnetic recording apparatus in accordance with claim 8 wherein said rotary head position detecting means comprises switching means for enabling one or the other of said rotary magnetic heads to receive said sufficient bias current level depending upon the instantaneous angular positions of said heads.

10. Magnetic recording apparatus in accordance with claim 9 wherein said input signal is supplied simultaneously to said rotary magnetic heads and wherein said control means comprises bias current by-pass means coupled to said respective magnetic heads, said bias current by-pass means being selectively actuated by said switching means to thereby reduce the magnitude of said bias current supplied to the rotary magnetic head not then scanning said magnetic medium.

* * * * *